(12) United States Patent
Balas et al.

(10) Patent No.: US 11,097,433 B2
(45) Date of Patent: Aug. 24, 2021

(54) LONG-RANGE SONAR

(71) Applicant: Diversey, Inc., Fort Mill, SC (US)

(72) Inventors: Stephen J. Balas, Midlothian, VA (US); Ralph C. McCann, III, Williamsburg, VA (US)

(73) Assignee: Diversey, Inc., Fort Mill, SC (US)

( * ) Notice: Subject to any disclaimer, the term of this patent is extended or adjusted under 35 U.S.C. 154(b) by 395 days.

(21) Appl. No.: 16/207,497

(22) Filed: Dec. 3, 2018

(65) Prior Publication Data

US 2019/0091882 A1 Mar. 28, 2019

Related U.S. Application Data

(63) Continuation of application No. 13/341,386, filed on Dec. 30, 2011, now Pat. No. 10,144,138.

(51) Int. Cl.
| | |
|---|---|
| *B25J 19/00* | (2006.01) |
| *B25J 19/02* | (2006.01) |
| *G01S 15/931* | (2020.01) |
| *G01S 7/524* | (2006.01) |
| *G01S 7/527* | (2006.01) |
| *G01S 15/10* | (2006.01) |
| *G01S 15/00* | (2020.01) |
| *G01S 7/529* | (2006.01) |

(52) U.S. Cl.
CPC ............ *B25J 19/026* (2013.01); *G01S 7/524* (2013.01); *G01S 7/5276* (2013.01); *G01S 15/10* (2013.01); *G01S 15/931* (2013.01); *A47L 2201/04* (2013.01); *G01S 7/529* (2013.01)

(58) Field of Classification Search
USPC .......................................................... 367/99
See application file for complete search history.

(56) References Cited

U.S. PATENT DOCUMENTS

| | | |
|---|---|---|
| 3,742,434 A | 6/1973 | Leyde et al. |
| 3,742,442 A | 6/1973 | Leyde et al. |
| 4,369,508 A | 1/1983 | Weber |
| 4,641,290 A | 2/1987 | Massa et al. |
| 5,668,340 A | 9/1997 | Hashizume et al. |
| 5,960,089 A | 9/1999 | Bouricius et al. |
| 6,714,481 B1 | 3/2004 | Katz et al. |
| 7,492,666 B2 | 2/2009 | Scoca et al. |
| 8,111,585 B1 | 2/2012 | Graber |

(Continued)

*Primary Examiner* — James R Hulka
(74) *Attorney, Agent, or Firm* — Fox Rothschild LLP

(57) ABSTRACT

A robotic device comprising a long-range sonar assembly configured to detect objects between 1000 mm to 9500 mm from the long range sonar assembly. The long-range sonar assembly comprises a flared bell housing and a transducer. The robotic device also comprises a transportation mechanism configured to move the robotic device in various directions in response to instructions from a processing device that is in communication with the ling-range sonar assembly and the transportation mechanism. The processing device may cause the long-range sonar assembly to, via the transducer transmit one or more pulses and receive the one or more pulses as echo pulses having reflected off an object in an environment. The processing device may then cause a transmitter to transmit instructions to the transportation mechanism to move the robotic device in the environment based on the received one or more pulses.

20 Claims, 6 Drawing Sheets

(56) References Cited

U.S. PATENT DOCUMENTS

| | | | |
|---|---|---|---|
| 10,144,138 B2 * | 12/2018 | Balas | G01S 7/5276 |
| 2003/0039171 A1 | 2/2003 | Chiapetta | |
| 2005/0007882 A1 | 1/2005 | Bachelor et al. | |
| 2005/0249035 A1 | 11/2005 | Chiappetta et al. | |
| 2005/0254218 A1 | 11/2005 | Mouri | |
| 2005/0285962 A1 | 12/2005 | Cornejo | |
| 2006/0056273 A1 | 3/2006 | Scoca et al. | |
| 2007/0025183 A1 | 2/2007 | Zimmerman et al. | |
| 2007/0076089 A1 | 4/2007 | DePue et al. | |
| 2008/0205194 A1 | 8/2008 | Chiappetta et al. | |
| 2009/0003134 A1 | 1/2009 | Nuttall et al. | |
| 2010/0256813 A1 | 10/2010 | Chiappetta et al. | |
| 2013/0173056 A1 | 7/2013 | Balas et al. | |
| 2013/0173057 A1 * | 7/2013 | Balas | G01S 15/931 700/258 |

* cited by examiner

LONG-RANGE SONAR

RELATED APPLICATIONS AND CLAIM OF PRIORITY

This application is a continuation of and claims priority to U.S. patent application Ser. No. 13/341,386, filed Dec. 30, 2011, the disclosure which is fully incorporated by reference.

BACKGROUND

The present disclosure relates to a long-range sonar system. More specifically, the present disclosure relates to a small scale sonar system configured to operate at long-ranges.

Existing sonar systems, such as ultrasonic sonar systems, are useful in determining a distance between the sonar system and a solid object. However, due to the physical characteristics of typical sonar systems, they do not provide as narrow a focus as may be desired for short-range operations. As such, due to these technical limitations, existing sonar systems typically cannot detect an object closer than about 200 millimeters. Similarly, due to technical limitations, existing small-scale sonar systems typically cannot detect an object further away than 2.5 meters.

Many devices utilize small-scale sonar systems. For example, robots such as automatic vacuum devices use a combination of small-scale short-range sonar and long-range sonar. Using this combination of short and long-range sonars, a robotic device can detect objects between 200 millimeters and 2.5 meters away. However, for use in cramped environments such as a home cluttered with furniture and other objects, this range may not be adequate to provide the robotic device with an appropriately functional sonar system for its surroundings. Similarly, in environments where objects are spaced further apart, this range may not be adequate to provide the robotic device with an appropriately functional sonar system.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general aspect, the embodiments disclose a robotic device. The robotic device may include a long-range sonar assembly comprising a flared bell housing and a transducer. The flared bell housing may be configured to enable the long range sonar assembly to detect objects between 1000 mm to 9500 mm from the long range sonar assembly, and may include an inner diameter configured for receiving a sub-assembly comprising the transducer, the inner diameter is less than an outer diameter of the flared bell housing. The robotic device may also include a transportation mechanism configured to move the robotic device in various directions in response to instructions from a processing device that is in communication with the ling-range sonar assembly and the transportation mechanism, and a computer-readable storage medium. The computer-readable storage medium may include one or more programming instructions that, when executed, will cause the processing device to cause the long-range sonar assembly, via the transducer, to transmit one or more pulses, and then receive the one or more pulses as echo pulses having reflected off an object in an environment. The processing device may then cause a transmitter to transmit instructions to the transportation mechanism to move the robotic device in the environment based on the received one or more pulses.

In one or more embodiments, the processing device may also determine a position of the robotic device in the environment relative to the object based on the one or more pulses as echo pulses having reflected off an object in an environment. Additionally and/or alternatively, the processing device may determine a position of the object in the environment. Optionally, the processing device may determine the position of the object by determining whether the object is located at an edge of a beam angle corresponding to the long-range sonar assembly or in front of the long-range sonar assembly. This may include accepting one or more of the echo pulses or reject one or more of the echo pulses based on a width of the echo pulses.

In some embodiments, the long-range sonar assembly may also include a grommet placed about the transducer and fitted within the inner diameter.

In certain embodiments, the transducer may be configured to transmit one or more pulses at a transmit frequency and to receive echoed pulses at a receive sensitivity. Optionally, the inner diameter may be shaped such that the one or more transmitted pulses will be transmitted in a narrow beam. Additionally and/or alternatively, the inner diameter may be shaped such that the echoed pulses will be received in a narrow beam.

In certain embodiments, the transducer may include an ultrasonic piezoelectric transducer.

In yet other embodiments, the outer diameter of the flared bell of the long-range sonar assembly may be configured to minimize an impedance mismatch between the long-range sonar assembly and air.

In at least one embodiment, the long range sonar assembly may also include a printed circuit board. The printed circuit board may include a local controller operably connected to the processing device and configured to receive instructions from the processing device, a transmit potentiometer operably connected to the local controller and configured to adjust a first transmit frequency, and a receive potentiometer operably connected to the local controller and configured to adjust a first receive sensitivity. The transducer may be operably connected to the receive potentiometer and the transmit potentiometer. The printed circuit board may also include a tunable transformer.

In some embodiments, a removable fastener may be used to affix the sub-assembly within the flared bell housing.

In another general aspect, the embodiments disclose a method of moving a robotic device. The method may include causing the transducer of a long-range sonar assembly to transmit one or more pulses. The transducer may be included within a flared bell housing of the long-range sonar assembly such that the flared bell housing enables the long range sonar assembly to detect objects between 1000 mm to 9500 mm from the long range sonar assembly. The method may also include causing the transducer to receive the one or more pulses as echo pulses having reflected off an object in an environment, and transmitting instructions to a transportation mechanism of the robotic device to move the robotic device in the environment based on the received one or more pulses.

DETAILED DESCRIPTION

As used herein, a "robot" or "robotic device" is a stand-alone system, for example, that is mobile and performs both physical and computational activities. The physical activities may be performed using a wide variety of movable parts including various tools, for example. The computational activities may be performed utilizing a suitable processor and computer readable memory devices, e.g., a data memory storage device, for example. The computational activities may include processing information input from various sensors or other inputs of the robotic device to perform commanded functions; processing the input information, as well as other data in the memory stores of the robotic device, to generate a variety of desired information; or outputting information that has been acquired or produced by the robotic device to a desired destination, for example.

"Short-range" sonar refers to a range from 0 mm to about 900 mm from a sonar system. For example, a short-rage sonar system according to an embodiment of the present disclosure may be configured to detect objects between 100 mm and 900 mm away from the sonar system. In an alternate embodiment, a short-range sonar system may be configured to detect objects between 50 mm and 900 mm away from the sonar system.

"Long-range" sonar refers to a range 1000 mm to about 9500 mm from the sonar system. For example, a long-rage sonar system according to an embodiment of the present disclosure may be configured to detect objects between 1000 mm and 9500 mm away from the sonar system.

Figure 1:
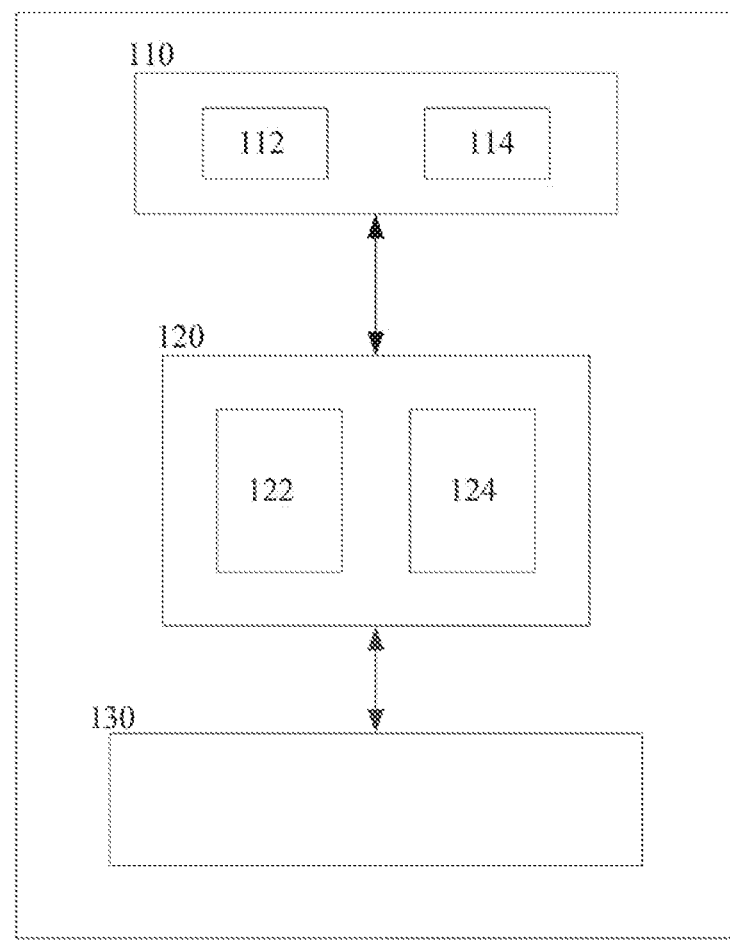
FIG. 1 illustrates a block diagram showing a robotic device according to an embodiment.

FIG. 1 illustrates a block diagram showing a mobile robotic device 100 in accordance with one embodiment of the present disclosure. As shown in FIG. 1, the robotic device 100 may include a sensor portion 110, a control portion 120 operably connected to the sensor portion, and a transport portion 130 operably connected to the control portion. It should be noted that the elements as shown in FIG. 1 are shown by way of example only. Additional information related to specific robotic devices is shown in U.S. Pat. No. 6,667,592, the content of which is hereby incorporated by reference in its entirety.

The sensor portion may include various components such as a short-range sonar assembly 112, a long-range sonar assembly 114, and other various sensor mechanisms such as a laser-based sensor, a global positioning system (GPS) device, a microwave sensor, and other similar sensors. The control portion 120 may include a processor 122 and a tangible computer readable medium 124 such as a hard drive, an optical drive, a flash drive, a read-only memory or a random access memory. The transport portion 130 may include a mechanical system of wheels or an electromechanical system, for example, for moving the robotic device from one place to another.

The components of the robotic device 100 as described may be configured to perform a wide variety of operations. The processor 122 may monitor and controls various operations of the robotic device 100. The computer readable medium 124 may be configured to store a wide variety of instructions and/or data used by the processor 124 as well as the other components of the robotic device 100.

The block diagram of FIG. 1 illustrates various operating components of the robotic device 100. It should be appreciated that the operating components of the robotic device 100, or select operating components of the robotic device 100, may be encased or enclosed in a suitable body or body portion. Alternatively, it should be appreciated that the operating components of the robotic device 100 may simply be suitably disposed on a support framework or structure.

Figure 2:
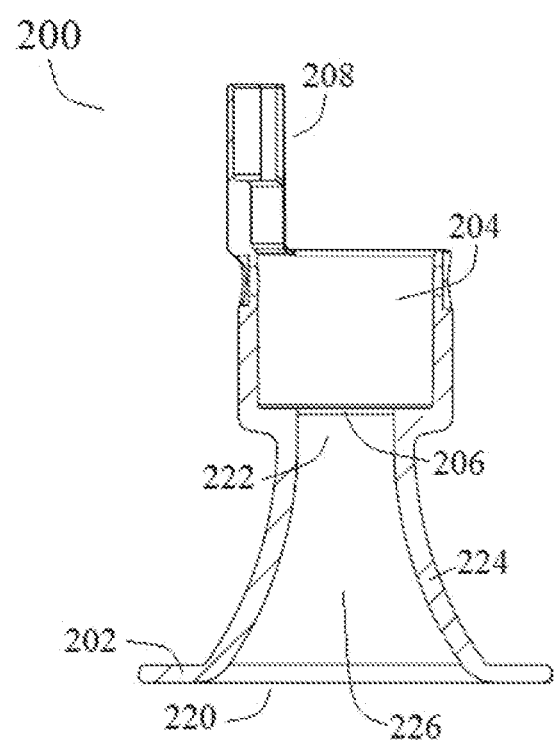
FIG. 2 illustrates a horn and kickplate assembly for a long-range sonar system.
Figure 3:
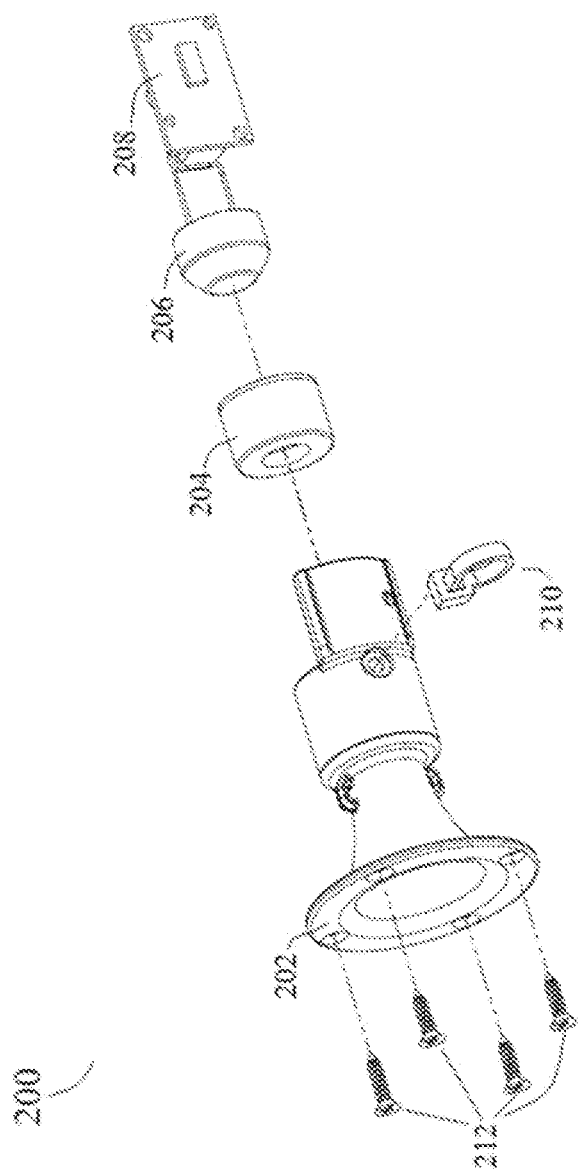
FIG. 3 illustrates an exploded view of the horn and kickplate assembly of FIG. 1.

FIG. 2 illustrates an exemplary long-range sonar assembly 200 for use in a robotic device such as robotic device 100 as shown in FIG. 1. The assembly 200 may include a molded or otherwise formed sonar horn 202 configured to enclose various other components of the assembly as well as direct any sonar signals emitted by the assembly and receive any echo signals resulting from the emitted sonar signals. A sonar sensor or transducer 206 may be placed within an enclosure in the sonar horn and held in position by a grommet 204, or another similar positioning device such as one or more O-rings. In an exemplary embodiment, the grommet 204 is made of rubber or another similarly deformable material such that a tight fit is formed between the sensor 206 and the horn 202, thus providing a watertight or water-resistant assembly 200. The horn 202 may further house a printed circuit board (PCB) 208 in an enclosure sized to receive and protect the PCB. The PCB 208 may be configured to control operation of both modes of the sensor 206, i.e., transmitting and receiving. One or more wire terminals (not shown in FIG. 2) may be used to operably connect the PCB 208 and a processing device such as processor 122 as shown in FIG. 1. The various components may be held within the horn 202 by one or more fasteners 210 removably affixed to the horn (as seen in FIG. 3).

The design of the horn 202 may be based upon the intended function of the assembly 200, i.e., to provide a long-range sonar assembly using a single enclosed transducer. The horn may have various specific design characteristics such as a lip or outer diameter 220, a rim or inner diameter 222, and a curved sidewall 224 that together form or define an opening or bell. The shape and design of the horn 202 may concentrate signals emitted from the sensor 206 in a narrow beam such that any received echo signals are received in a similarly concentrated beam. For example, the sensor 206 may be placed within the horn 202 such that pulses emitted from the sensor are confined and concentrated by the bell shape of the horn, resulting in a narrow beam of emitted pulses. This narrow beam, and resulting narrowly focused echoes or returned signals, allows the sensor assembly 200 to be configured to operate as a long-range sonar assembly having a longer range when compared to traditional sonar assemblies. The horn 202 may be designed to minimize impedance mismatch between the sensors' face and the air of the environment in which the robotic device is operating. Specifically, the lip or outer diameter 220 may contribute to minimizing any impedance mismatch.

In an exemplary embodiment, the inner diameter 222 may be slightly larger than an outer diameter of the sensors 206 and the grommet 204, e.g., the sensor's outer diameter may be 18 mm and fitted within the grommet, which has an outer diameter of 22 mm. The horn's inner diameter 222 may be 24 mm, sized to accept the grommet 204. The horn 202 may be further designed such that the curve 224 defines a slowly expanding cavity 226 between the sensors 206 and the outside of the horn. The outer diameter 220 may be approximately equal to the inner diameter 222 plus the distance of curve 224. However, it should be noted that the specific design of horn 202 as shown in FIG. 2 is by way of example only and may be modified based upon desired sonar distances, scale of the robotic device the assembly 200 is being integrated into, and other various factors.

In an exemplary embodiment, the sensor 206 may be a long-range sonar transducer. Additionally, in a preferred embodiment, the sensor 206 is a closed-face sensor, thereby further protecting the sensor from any water or debris.

An exemplary sensor 206 may be a tunable ultrasonic piezoelectric transducer. The transducer may be configured to operate at approximately 40 KHz, +/−1.0 KHz, and having a 2.0 KHz bandwidth. The transducer may have a transmitting sound pressure level of approximately 108 dB at 40 KHz, and a receiving sensitivity of approximately −75 dB at 40 KHz. The transducer may be configured to output beam or set of pulses having a transmission angle approximately 85° wide, which is further narrowed by the geometry of the horn 202 as discussed above. Depending on the application of the transducer, the transducer may be tuned to produce a specific band of transmitted signals, and similarly tuned to receive a specific band of echoed signals. Specific tuning of the transducer is discussed below in reference to FIG. 4.

FIG. 3 shows an exploded view of the long-range sonar assembly of FIG. 2, illustrating how the various components are fitted together. In an exemplary embodiment, the sensor 206 is placed within the grommet 204. The grommet 204, sensor 206 and the PCB 208 are placed into the horn 202 such that the grommet and horn form a tight seal, thereby resulting in a watertight seal between the grommet, horn and the sensors. A wire harness may be operably connected to the PCB 208 prior to assembly, e.g., via solder connections to the one or more terminals mounted on the PCB. Alternatively, the wire harness may be removably connected to the PCB 208 during assembly, e.g., via a modular connector.

The various components may be physically held within the assembly 200 by fastener 210 removably attached to the horn 202. The fastener 210 may be a screw, bolt, clip, or other similar removable fastening devices. Additionally, a plurality of fasteners 212 may be provided for removably attaching the assembly 200 to a robotic device such as robotic device 100 as shown in FIG. 1. The fasteners 210 may be screws, bolts, clips, or other similar removable fastening devices.

Figure 4:
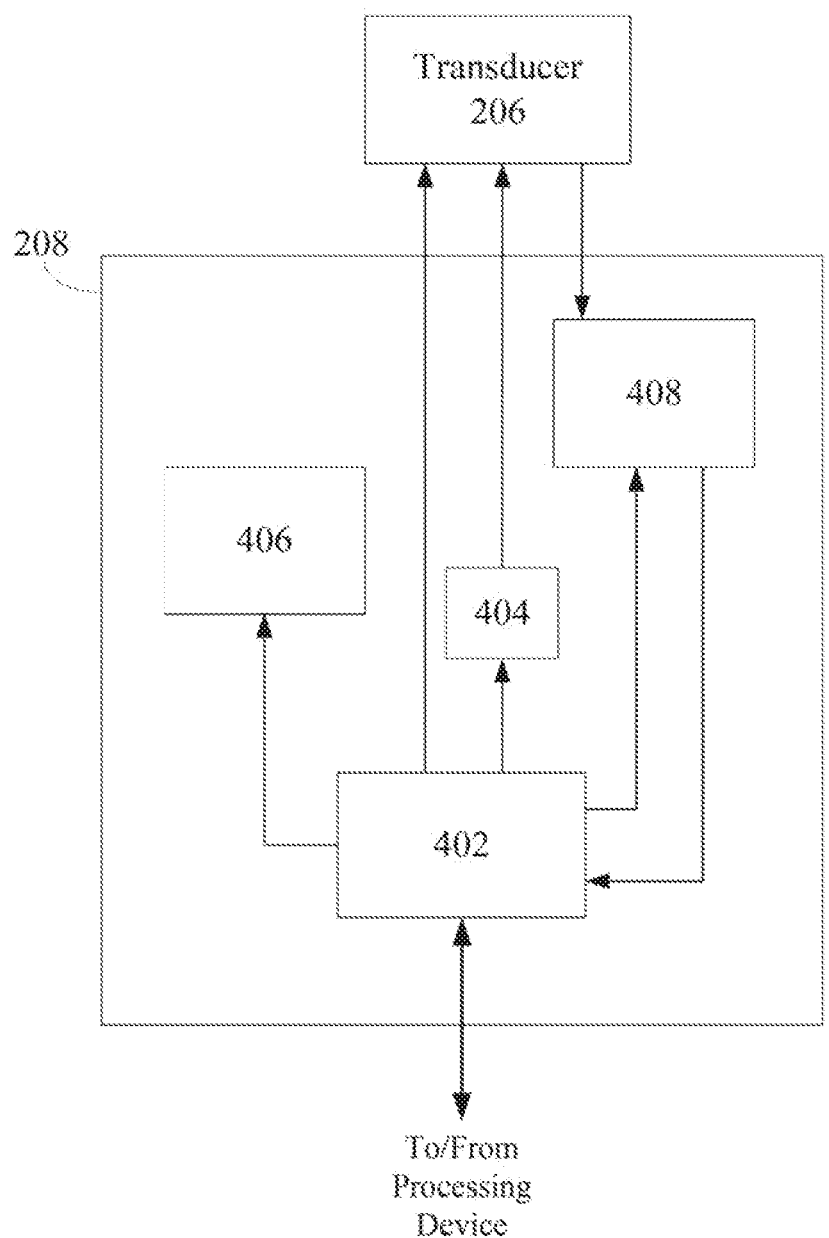
FIG. 4 illustrates a circuit diagram for a long-range sonar assembly according to an embodiment.

FIG. 4 illustrates an exemplary circuit diagram for PCB 208. The PCB 208 may include a logic controller 402 operably connected to a processing device such as processor 122 via a wire harness or other operable connection. The logic controller 402 may be configured to receive instructions from the processing device related to specific operation of the sensor 206. For example, the processing device may transmit an instruction to the logic controller 402 to begin sonar operation. The logic controller 402 may be operably connected to a tunable transformer 404 as well as potentiometers 406 and 408. It should be noted that two potentiometers 406, 408 are shown by way of example only. Each of the potentiometers 406 and 408 may be tunable to adjust various parameters of the transducer 206 and/or the PCB 208. For example, the potentiometer 406 may be configured to adjust the frequency of pulses emitted by the transducer 206. The potentiometer 408 may be configured to adjust a gain of an echo receiver circuit. It should be noted, however, that the arrangement and function of potentiometers 406 and 408 as shown in FIG. 4 is by way of example only and is not critical to the function of the long-range sonar assembly as described herein.

The potentiometer 406 may be operably connected to and configured to receive an instruction from the logic controller 402 to begin generating pulse signals at a certain frequency. The transducer 206 may begin transmitting the pulses accordingly. Similarly, the potentiometer 408 may be operably connected to the transducer and configured to receive any echoes detected by the transducer. The receive potentiometer 408 may be configured to receive an instruction from the logic controller 402 to adjust a gain or sensitivity at which echoes are received at the transducer. The receive potentiometer 408 may be further operably connected to the transducer 206 such that an operational voltage at the potentiometer may be adjusted depending on the desired gain of the potentiometer.

It should be noted the inclusion and arrangement of the components on PCB 208 as shown in FIG. 4 is shown by way of example only and may be adjusted based upon the functions of the individual components and the implementation of the PCB. For example, the individual sensor may include driver logic and be mounted directly on the PCB 208 and operably connected to the logic controller 402. Additionally, standard circuit components may be included as need to regulate various parameters of the PCB 208 such as voltage, current, and other related parameters. Various resistors, capacitors, timing circuits, power supplies, and other similar circuit components and logic may be included and would be obvious to one of ordinary skill in the art.

Figure 5:
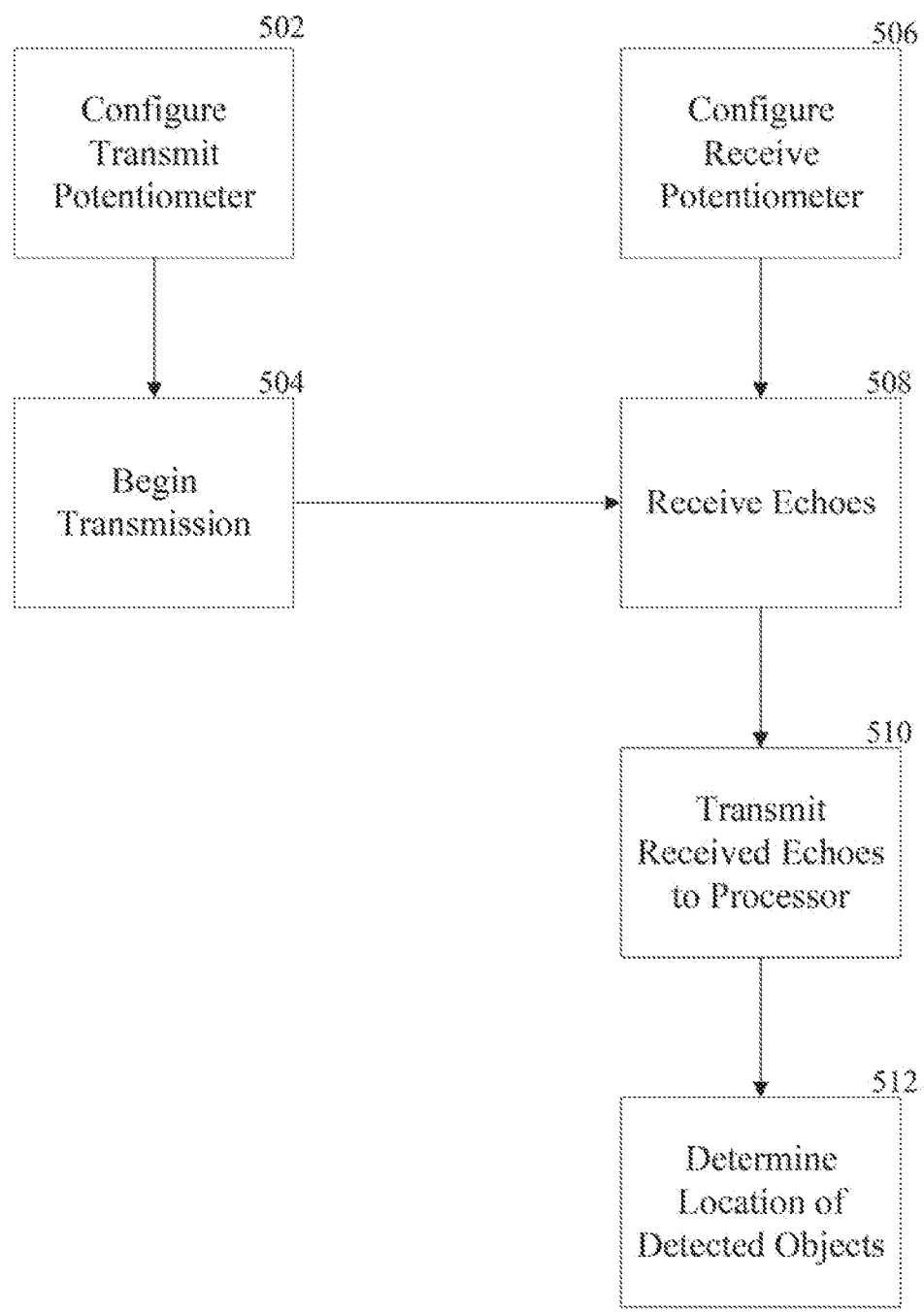
FIG. 5 illustrates a flow diagram for a method of using the long-range sonar assembly according to an embodiment.

FIG. 5 illustrates an exemplary flow chart for using a long-range sonar assembly integrated in a robotic device according to an exemplary embodiment. A transmit potentiometer (e.g., potentiometer 406 as shown in FIG. 4) may be configured 502 to set a frequency for transmitted pulses. The long-range sonar assembly may begin transmitting 504 pulses via the transducer (e.g., sensor 206 as shown in FIG. 2) as instructed by the processing device.

A receive potentiometer (e.g., potentiometer 408 as shown in FIG. 4) may be configured 506 to set a gain or sensitivity level for determining received echoes. The receive potentiometer may receive 508 echoes from the transducer reflected or otherwise rebounded from one or more objects in proximity to the transducer. The received echoes are detected by the local controller and transmitted 510 to the processing device. The processing device may process this information to determine 512 the location of the object(s) in close proximity. The processing device may send instructions to various other components such as a motor or other drive mechanism to steer the robotic device away from or around the object(s). A software algorithm used by the processing device to determine the location of the object(s) may be able to accept or reject echoes based upon a width (in time) of the returned echoes. This software algorithm may be useful in determining whether an object is on the edge of the beam angle, or more directly in front of the sensor.

Figure 6:
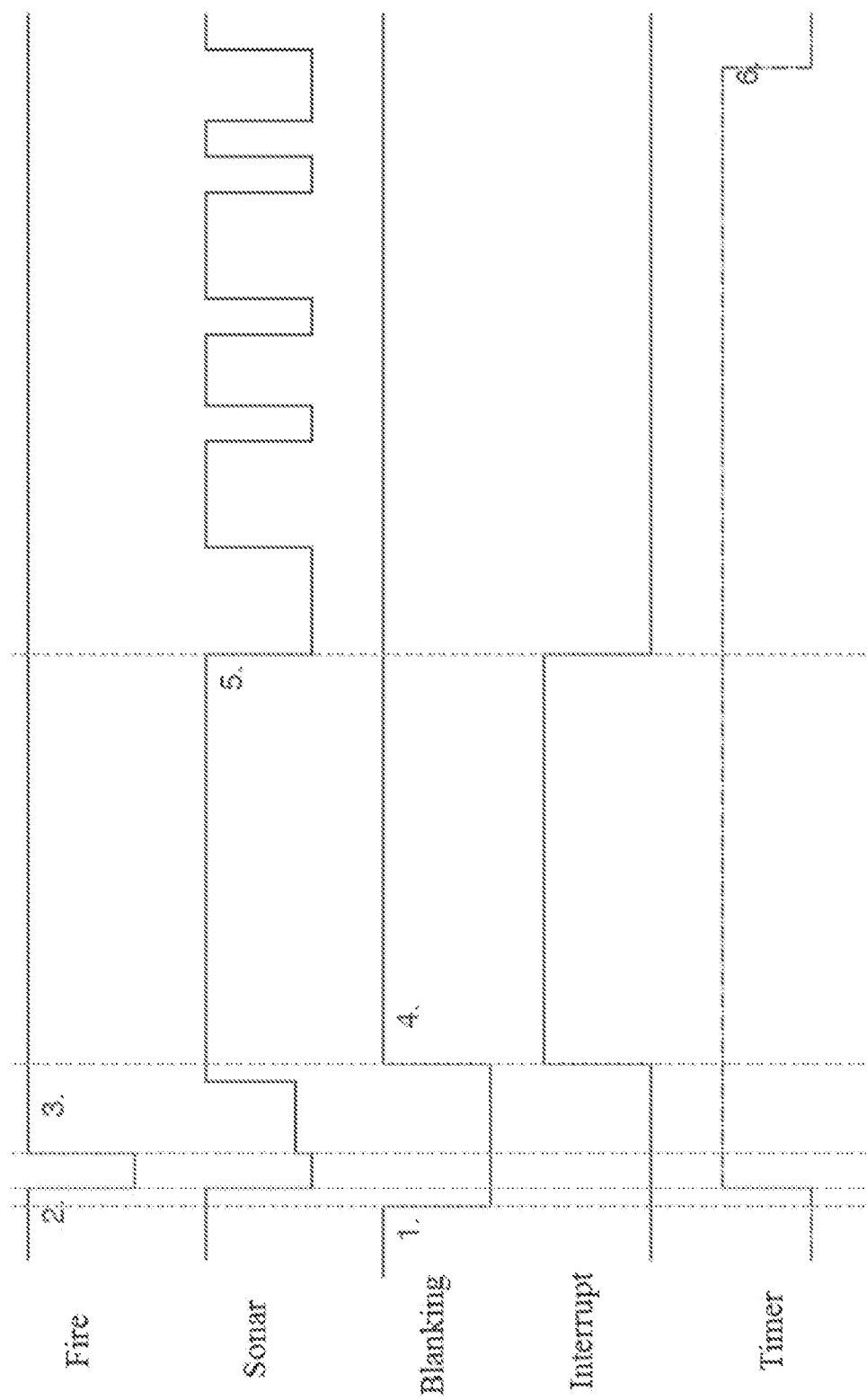
FIG. 6 illustrates a timing diagram for using the long-range sonar according to an embodiment.

FIG. 6 illustrates an exemplary timing diagram for a long-range sonar assembly such as that described herein. Initially, at point 1, a Blanking signal may be set low and an Interrupt signal may be disabled. Also, a Timer may be activated. It should be noted the Timer is merely a measurement of time passed, and is not an active signal. While the Blanking signal is low, a fire signal may be transferred from the processing device at point 2 to the local controller to begin transmitting sonar. The Sonar signal may also be set low at point 2. At point 3, the fire signal may return high and the Sonar signal may stop transmitting pulses. The slight rise in the Sonar signal following point 3 may be the transducer continuing to vibrate following the transmitted pulse(s). At point 4, the Blanking signal may return to a high state and the Interrupt signal may be enabled. After a period of time, the transducer may begin to receive echoed pulses. For example, at point 5, the Sonar signal shows various received pulses. Upon receipt of the first echoed pulse, the Interrupt signal may again be disabled. At point 6, the Timer may expire and any data related to the received pulses may be transferred from the local controller to the processing device accordingly as discussed above in reference to FIG. 5.

The above discussed long-range sonar may be integrated into various products and applications where detecting an object at a long distance is desirable while still maintaining a small-scale sonar assembly. For example, as discussed above, automatic vacuuming devices may incorporate a long-range sonar assembly as described herein to better detect objects positioned about the vacuum device as well as the shape of the environment the vacuum device is operating in. Additionally, auto manufacturers may incorporate a similar long-range sonar assembly into various positions on a vehicle such as the front and rear bumper to detect when the vehicle is approaching another car and present a warming to the operator of the vehicle to maintain a safe distance from the other car, e.g., during higher speed driving.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A robotic device comprising:
   a long-range sonar assembly comprising a flared bell housing and a transducer, wherein:
      the flared bell housing comprises an inner diameter configured for receiving a sub-assembly comprising the transducer,
      the inner diameter is less than an outer diameter of the flared bell housing, and
      the flared bell housing is configured to enable the long range sonar assembly to detect objects between 1000 mm to 9500 mm from the long range sonar assembly;
   a transportation mechanism configured to move the robotic device in various directions in response to instructions from a processing device that is in communication with the ling-range sonar assembly and the transportation mechanism; and
   a computer-readable storage medium comprising one or more programming instructions that, when executed, will cause the processing device to:
      cause the long-range sonar assembly to transmit, via the transducer, one or more pulses,
      cause the long-range sonar assembly to receive, via the transducer, the one or more pulses as echo pulses having reflected off an object in an environment, and
      cause a transmitter to transmit instructions to the transportation mechanism to move the robotic device in the environment based on the received one or more pulses.

2. The robotic device of claim 1, the computer-readable storage medium may also include programming instructions to determine a position of the robotic device in the environment relative to the object based on the one or more pulses as echo pulses having reflected off an object in an environment.

3. The robotic device of claim 2, wherein the instructions that will cause the processing device to determine the position of the robotic device in the environment relative to the object further comprise programming instructions to determine a position of the object.

4. The robotic device of claim 3, wherein the instructions that will cause the processing device to determine the position of the object further comprise programming instructions that will cause the processing device to determine whether the object is located at an edge of a beam angle corresponding to the long-range sonar assembly or in front of the long-range sonar assembly.

5. The robotic device of claim 4, wherein the instructions that will cause the processing device to determine whether the object is located at the edge of a beam angle corresponding to the long-range sonar assembly or in front of the long-range sonar assembly comprise instructions that will cause the processing device to accept one or more of the echo pulses or reject one or more of the echo pulses based on a width of the echo pulses.

6. The robotic device of claim 1, wherein the long-range sonar assembly further comprises a grommet placed about the transducer and fitted within the inner diameter.

7. The robotic device of claim 1, wherein the transducer is configured to transmit one or more pulses at a transmit frequency and to receive echoed pulses at a receive sensitivity.

8. The robotic device of claim 7, wherein the inner diameter is shaped such that the one or more transmitted pulses will be transmitted in a narrow beam.

9. The robotic device of claim 7, wherein the inner diameter is shaped such that the echoed pulses will be received in a narrow beam.

10. The robotic device of claim 1, wherein the transducer comprises an ultrasonic piezoelectric transducer.

11. The robotic device of claim 1, wherein the outer diameter of the flared bell of the long-range sonar assembly is configured to minimize an impedance mismatch between the long-range sonar assembly and air.

12. The robotic device of claim 1, wherein the long range sonar assembly further comprises a printed circuit board comprising:
   a local controller operably connected to the processing device and configured to receive instructions from the processing device;
   a transmit potentiometer operably connected to the local controller and configured to adjust a first transmit frequency; and
   a receive potentiometer operably connected to the local controller and configured to adjust a first receive sensitivity, wherein:
      the transducer is operably connected to the receive potentiometer and the transmit potentiometer.

13. The robotic device of claim 12, wherein the printed circuit board further comprises a tunable transformer.

14. The robotic device of claim 1, further comprising a removable fastener for affixing the sub-assembly within the flared bell housing.

15. A method controlling movements of a robotic device, the method comprising, by a processing device:
cause a long-range sonar assembly to transmit, via a transducer, one or more pulses, wherein the transducer is included within a flared bell housing of the long-range sonar assembly such that the flared bell housing enables the long range sonar assembly to detect objects between 1000 mm to 9500 mm from the long range sonar assembly;
cause the long-range sonar assembly to receive, via the transducer, the one or more pulses as echo pulses having reflected off an object in an environment; and
transmit instructions to a transportation mechanism of the robotic device to move the robotic device in the environment based on the received one or more pulses.

16. The method of claim 15, further comprising determining a position of the robotic device in the environment relative to the object based on the one or more pulses as echo pulses having reflected off an object in an environment.

17. The method of claim 16, wherein determining the position of the robotic device in the environment relative to the object further comprises determining a position of the object.

18. The method of claim 17, wherein determining the position of the object further comprises determining whether the object is located at an edge of a beam angle corresponding to the long-range sonar assembly or in front of the long-range sonar assembly.

19. The method of claim 18, wherein determining whether the object is located at the edge of a beam angle corresponding to the long-range sonar assembly or in front of the long-range sonar assembly comprises accepting, via a transducer, one or more of the echo pulses or rejecting one or more of the echo pulses based on a width of the echo pulses.

20. The method of claim 15, wherein the transducer is configured to transmit one or more pulses at a transmit frequency and to receive echoed pulses at a receive sensitivity.

* * * * *